BIT-ORGANIZED SENSE LINE ARRANGEMENT

Filed April 1, 1966 2 Sheets-Sheet 1

INVENTORS
JOHN F. BRUDER
DALE L. FAUSETT
BY Thomas J. Nikolai
ATTORNEY

BIT-ORGANIZED SENSE LINE ARRANGEMENT

Filed April 1, 1966 2 Sheets-Sheet 2

United States Patent Office
3,465,313
Patented Sept. 2, 1969

3,465,313

BIT-ORGANIZED SENSE LINE ARRANGEMENT

John F. Bruder, Minneapolis, and Dale L. Fausett, White Bear Lake Township, Ramsey County, Minn., assignors to Sperry Rand Corporation, New York, N.Y., a corporation of Delaware Filed Apr. 1, 1966, Ser. No. 539,481
Int. Cl. G11b *5/00*
U.S. Cl. 340—174 6 Claims

ABSTRACT OF THE DISCLOSURE

Apparatus utilized for the storage of digital data and in particular a method of wiring a sense line in a two-dimensional array of magnetizable memory elements.

Figures 1, 2:
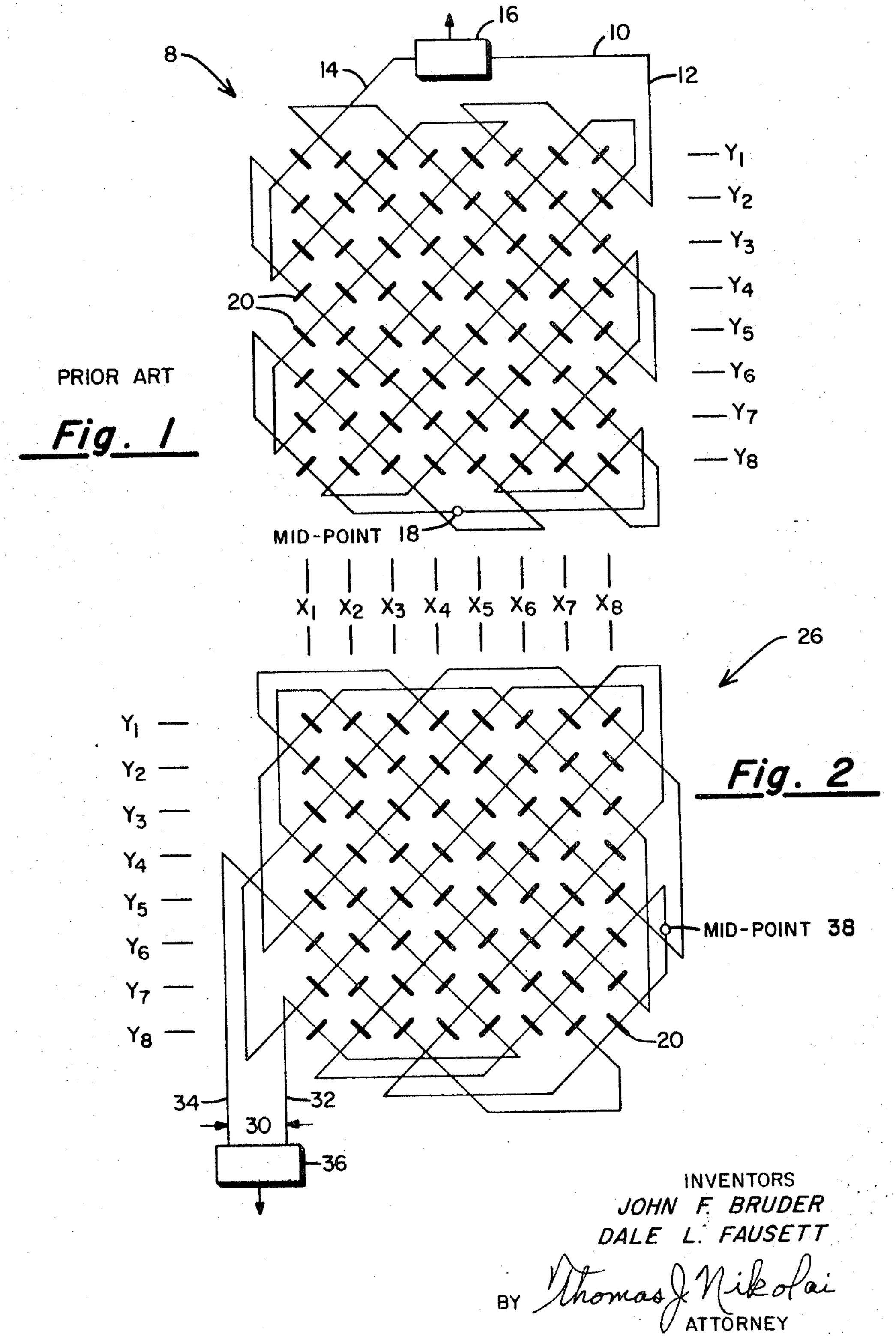

This invention in its preferred embodiment relates to the utilization of small cores of magnetizable material as logical memory elements in electronic data processing systems. The value of the use of such memory elements is based upon the bistable characteristic of magnetizable cores which characteristics include the ability to retain or remember remanent magnetic conditions which may be utilized to indicate a binary "1" or a binary "0."

Ordinary magnetizable cores and circuits utilized in electronic data processing systems are now so well known that they need no special description herein. However, for purposes of the present invention, it should be understood that such magnetizable cores are capable of being magnetized to saturation in either one of two opposite directions of polarization. Furthermore, these cores are formed of magnetizable material selected to have a rectangular hysteresis characteristic which ensures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core's magnetic state corresponding to a particular direction of saturation, i.e., positive saturation in denoting a binary "1" through the other magnetic state corresponding to the opposite direction of saturation, i.e., negative saturation, denoting a binary "0." One or more output coils, or sense lines, are usually provided to sense when the core switches from one state of saturation to the other. Switching can be achieved by passing a current pulse of sufficient amplitude through the input winding in a manner so as to set up a magnetic field in the area of the magnetizable core in the sense opposite to the pre-existing flux direction, thereby driving the core to saturation in the opposite direction of polarity, i.e., of positive to negative saturation. When the core switches, the resulting magnetic field variation induces a signal in the winding on the core such as, for example, the above mentioned output or sense winding. The material of the core may be formed of various magnetizable materials. The terms "signal," "pulse," etc. when used herein shall be used interchangeably to refer to the current signal that produces the corresponding magnetic field and to the magnetic field produced by the corresponding current signal.

One well known technique of achieving readout of a magnetizable memory element, or core, is that of the well known coincident current, i.e., bit-organized technique. This method utilizes the threshold characteristic of a core having a substantially rectangular hysteresis characteristic. In this technique, a minimum of two interrogate lines thread the core's central aperture, each interrogate line setting up a magnetomotive force in the memory core that is one-half the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic change as an indication of the information content of such core.

Another well known technique of achieving readout of a magnetizable memory element, or core, is that of the well known word-organized technique. This method utilizes a separate interrogate line per multibit word wherein each line threads the associated core's central aperture. The separate interrogate line sets up a magnetomotive force in the coupled memory core that is sufficient to completely switch the memory core from a first to a second and opposite magnetic state. In this technique each like ordered bit of the multibit words of the two-dimensional array is coupled to a like ordered sense line wherein there are as many separate sense lines per two-dimensional array as there are bits in the multibit words.

Typical three-dimensional bit-organized memory systems that are utilized in present day electronic data processing systems are comprised of a plurality Z of similar two-dimensional arrays of toroidal ferrite cores. The cores of each two dimensional array are arranged in X columns and Y rows with a core at the intersection of each column and row; providing XY cores for each two-dimensional array or a total of XYZ cores for each three-dimensional system. Conventionally, in each two-dimensional array all of the cores along each X column are threaded by a separate X drive line and all the cores along each Y row are threaded by a separate Y drive line. Accordingly, the energization of one selected X line and one selected Y line per two-dimensional array by half-select current signals fully selects the one core at the intersection of the selected X and Y lines and one-half selects the other cores along the selected X and Y lines while the other cores of the two-dimensional array are not directly affected by the half-select signals. Further, conventionally, all the cores of each two-dimensional array are threaded by a separate sense line for carrying off the signals induced therein by the effecting of a threaded core by the selection currents, and are threaded by an inhibit line for conducting an inhibit current signal of the same magnitude as but of the opposite polarity to the half-select signals for inhibiting the substantial effecting of the magnetization of the fully selected core.

The three-dimensional system is generally assembled by the serial interconnection of the like positioned X drive lines of each two-dimensional array and by the serial interconnection of the like positioned Y drive lines of each two-dimensional array while the sense line and inhibit line of each two-dimensional array are retained as separate lines. By the energization, or selection, of one of the serially interconnected X lines and one of the serially interconnected Y lines of the three-dimensional system, each like positioned core on each two-dimensional array is effected by a full select current signal whereby a signal is induced in the sense line of each two-dimensional array that is representative of the magnetic state, or information content, of the fully selected cores of the three-dimensional array. In this arrangement the length of the stored multibit word is equal to the number Z of the separate two-dimensional arrays whereby Z bits are read out in parallel upon energization of one interconnected X line and one interconnected Y line of the three-dimensional system. For the writing operation one of the serially interconnected X lines and one of the serially interconnected lines of the three-dimensional system are each energized by half-select current signals of opposite polarity to the readout current signals thereby setting the fully selected core in each two dimensional array in a "1" state. If it is desired that a fully selected core is to be set into a "0" state, i.e., permitted to remain in its initial set state established by the readout operation, the inhibit line associated with the two-dimensional array in which the "0" is included is energized by a half-select inhibit current signal that is similar to the half select readout signal. The inhibit signal inhibits the writing of a "1" permitting the effective core to remain in its set "0" state.

Memory systems, both of the two-dimensional and three-dimensional arrangements are subject to many sources of extraneous noise, which noise may induce the erroneous readout of the information stored within the memory system. To reduce the sources and amplitudes of such noise signals many expedients have been employed; various drive lines patterns, various sense lines patterns, differential amplifier coupled to split sense lines, and common mode rejection schemes. Although such expedients have reduced extraneous noise signals, problems of different capacitive pickup, even in split sense line arrangements utilizing common noise rejection, may under worst-case conditions provide erroneous information readout. The present invention provides an improved sense line pattern for any memory system which patern provides a reduced difference noise in a sense line which noise is caused, inter alia, by unbalanced capacitive pickup of a common mode noise that is generated by the memory selection drive system. The proposed sense line pattern of the present invention provides a more even distribution of noise pickup on the sense line halves regardless of the X, Y drive line selection employed.

Accordingly, it is a primary object of the present invention to provide an improved memory array.

It is a further object of the present invention to provide an improved storage element array utilizing a sense line pattern that provides a more even distribution of noise pickup.

These and other more detailed and specific objectives will be disclosed in the course of the following specification, reference being had to the accompanying drawings.

The present invention relates in one embodiment to a method of reducing noise in a bit-organized memory system and more specifically to a sense line stringing, or threading, pattern that reduces excessive noise that is generated in the sense line by unequal coupling of the X, Y selection fields to the two halves of the continuous sense line. The unequal field coupling of the two sense line halves results from a built-in unbalance between the sense line halves when particular combinations of X, Y drive lines are selected. That is, the cores associated with the particular X, Y selection combination are not in many instances evenly distributed on the sense line halves. This condition is aggravated as the memory size is increased. The field-induced noise unbalance is manifested as a difference noise signal that is coupled to the differential amplifier across the sense line terminals. In some cases this difference noise may be of sufficient magnitude to be erroneously detected as a "1" signal from the memory's particular two-dimensional array. To reduce the maximum difference noise signal the present invention proposes an improved method of threading the sense line in the two-dimensional array of a magnetic memory system so as to provide a more equal distribution of the selected cores on the sense line halves, thus reducing the maximum noise unbalance for the selected X, Y drive line combination.

The theory of the present invention is that if the noise pickup on each sense line half could be made equal at the input of the differential sense amplifier, the differential sense amplifier noise rejection would be maximized; thus, providing a maximum signal-to-noise ratio. To implement this inventive concept it has been assumed by the inventors that the noise coupling effect of each core is a linear function of the distance of the selected core from the midpoint of the sense line. Accordingly, the noise pickup effect of each core is weighted in an increased arbitrary increment of one in accordance with such core's relative distance from the midpoint of the sense line. Thus, the core nearest the sense line midpoint is given a weight of 1 while the core furthest from the sense line midpoint, i.e., nearest the differential sense amplifier, is given the weight of $n$, where $n$ is the number of cores coupled to the sense line half. The percentage of the noise pickup unbalance is determined by the difference between:

(a) The total weighted noise pickup unbalance on a first sense line half, less (b) The total weighted noise pickup unbalance on the other sense line half, (c) Divided by the sum of (a) and (b) or $$\frac{a-b}{a+b}=\text{percent noise pickup unbalance}$$

Using this weighing system with a 16 by 16 two-dimensional array of toroidal ferrite cores, the maximum noise pickup unbalance in the proposed sense line organization of FIG. 2 was found to be less than 5% while in the prior art sense line organization of FIG. 1 it was found to be in the order of 35%. Thus, the proposed sense line organization does effect a significant reduction in maximum differentiated noise in a bit-organized system over that of the prior art.

With particular reference to FIG. 1 there is illustrated a prior art arrangement for the method of threading the sense line through the cores of a two-dimensional array; such as illustrated in J. Kent, Patent No. 3,012,321 patented Dec. 5, 1961. In this prior art arrangement sense line 10 may be considered to be comprised of 2 half-portions 12 and 14 that are coupled across differential sense amplifier 16, which half-portions 12, 14 are illustratively joined at midpoint 18. In this typical prior art arrangement a first half portion 12 of sense line 10 enters the two-dimensional array 8 of 64 cores 20 at a first corner of such array 8 at a line normal to the plane of such corner core, which line is at 45° angle to the respective sides of such array 8, and threads through diagonal rows of cores reversing direction in every second diagonal row through array 8 to midpoint 18. The second half portion 14 re-enters array 8 at another corner core at an angle of 90° to the line of entry established by the first half section 12 whereby the second half section 14 of sense line 10, in a like manner as did the first half section 12, threads itself through array 8 threading every second diagonal line reversing its self and proceeding through array 8 exiting from the opposite diagonal corner core from which it entered and thence proceeds to the differential amplifier 16. With respect to the arrangement of FIG. 1 it can be seen that the first half section 12 of sense line 10 threads array 8 in a first and second opposite direction while the second half-section 14 of sense line 10 threads array 8 in a first and second and opposite direction which first and opposite directions are at an angle of 90° to the first and opposite directions of the manner of threading half-section 12. Thus, generally speaking in this prior art arrangement at no point in array 8 do the first half-section 12 and the second half-section 14 proceed in a parallel-like manner through array 8.

With particular reference to FIG. 2 there is illustrated a preferred embodiment of the inventive concept of the present invention. In this arrangement two-dimensional array 26 consists of a 8 by 8 array of cores 20 arranged in 8 columns Y and 8 rows X wherein all cores 20 are oriented with each adjacent core in any row or column being displaced approximately 90° with respect to the next adjacent core whereby sets of parallel diagonal rows are formed in orthogonal relationship with the parallel diagonal rows of each set being formed by the alternate diagonals of array 26. This arrangement of cores 20 is identical to that of FIG. 1.

In the illustrated embodiment of FIG. 2 a first half portion 32 of sense line 30 enters array 26 at a first corner core on a diagonal of array 26, reverses itself every fourth diagonal proceeding through array 26, re-enters array 26 at a corner core at a diagonal orthogonal to the line of entry at the first core, reverses itself every fourth diagonal and proceeds through array 26 terminating in midpoint 38. The second half-section 34 of sense line 30 from midpoint 38 re-enters array 26 in an opposite direction from which half-section 32 exited and proceeds through array 26 in manner parallel to half-section 34 threading every fourth diagonal in a manner similar to that of half-section 32 terminating at differential sense amplifier 36.

Figure 3:
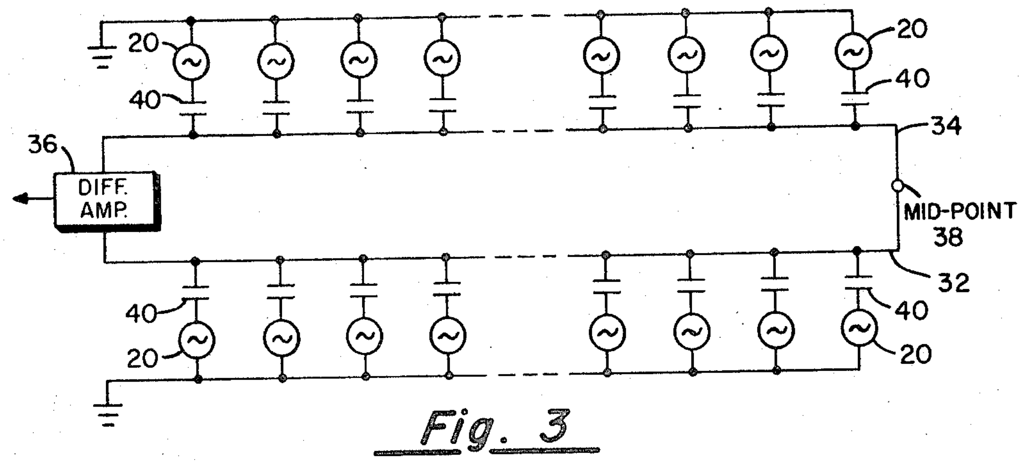

With particular reference to FIG. 3 there is illustrated a circuit that is the electrical equivalent of sense line halves 32, 34 as coupled across differential amplifier 36. As discussed above the theory of the present invention is that if the noise pickup effect on each sense line half could be made equal at the input to the differential sense amplifier, the differential sense amplifier noise rejection would be maximized, thus providing a maximum signal-to-noise ratio. Further, as it is believed by the inventors that the noise pickup effect is a function of the distance of each selected core from the midpoint of the sense line 30, the cross 20 on each half sense line 32, 34 have been weighted in an increased increment of 1 in accordance with such core's relative distance from the midpoint 38 of the sense line 30. As in the illustrated embodiment of FIG. 2, array 26 consists of an 8 by 8 array of cores 20 providing a total of 64 cores 20 thus providing 32 cores 20 per sense line half such cores have been weighted 1 through 32 proceeding from midpoint 38 toward differential amplifier 36 along the respective sense line half 32 and 34. These capacitive noise pickup generators have been schematically illustrated as consisting of a core 20 and a serially arranged capacitor 40 that schematically illustrates the noise coupling between the respectively weighted core and the sense line half 32 or 34.

Figure 4:
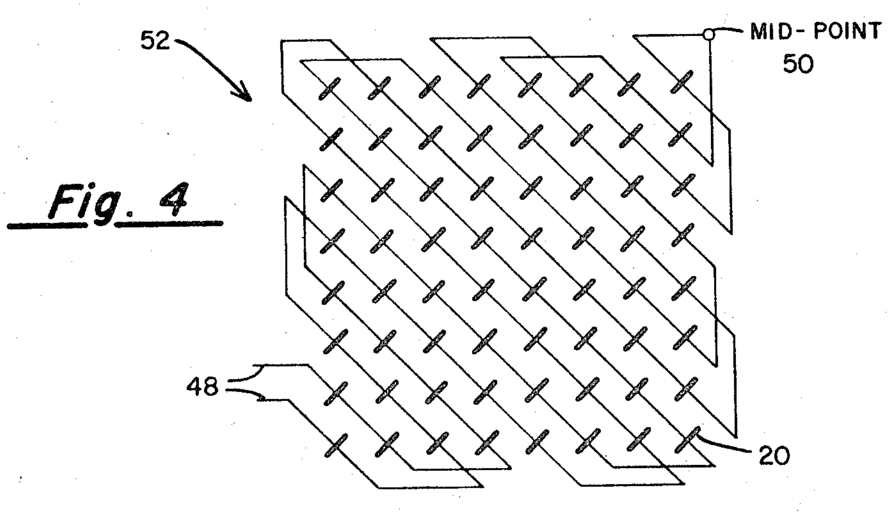
Figure 5:
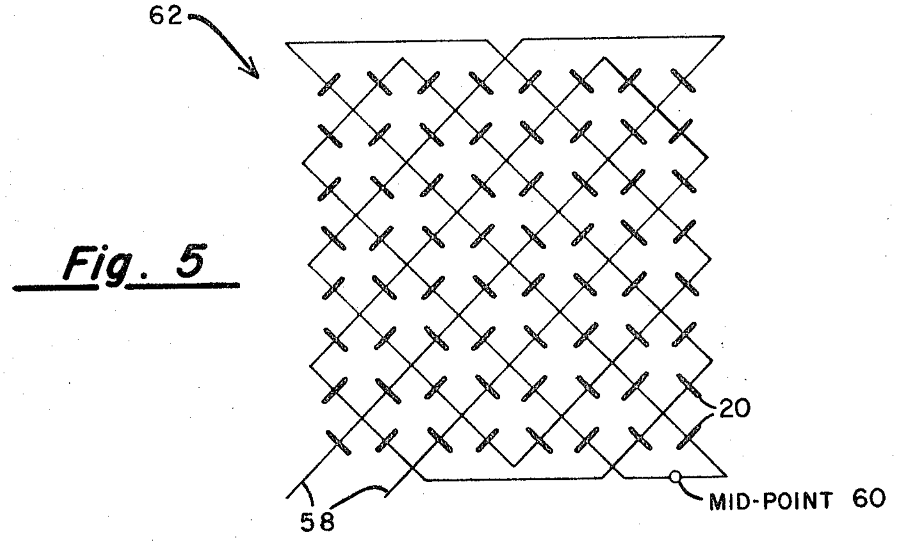

With particular reference to FIGS. 4 and 5 there are illustrated other embodiments of the present invention. As is apparent from the discussion relating to FIG. 2 the present invention proposes, inter alia, a sense line pattern for two-dimensional memory systems in which the looped sense line forms two substantially equal-length half-sections in which like portions of each half section i.e., portions of each half-section that are substantially the same distance from the midpoint of the sense line, thread pairs of adjacent rows along diagonal rows of cores. This sense line arrangement maximizes differential noise reduction.

With particular reference to FIG. 4 the looped sense line 48, by parallel like-portions, enters the array 52 on a first diagonal through a corner portion of the array and proceeds through the array of cores 20 along the same first diagonal in alternate directions terminating at midpoint 50. With particular reference to FIG. 5 the looped sense line 58, again by parallel like-portions, enters the array 62 on a first diagonal through the center portion of the array and proceeds through the array of cores 20 along the first diagonal, reverses its direction through the array on the same first diagonal through pairs of adjacent rows of cores, passes through the array on a second diagonal, passes through the array on a first diagonal, passes through the array on a second diagonal, reverses its direction through the array on the same second diagonal with the exiting parallel like-portions meeting at midpoint 60.

It is understood that suitable modifications may be made in the structure as disclosed provided that such modifications come within the spirit and scope of the appended claims. Having now, therefore, fully illustrated and described our invention, what we claim to be new and desire to protect by Letters Patent is set forth in the appended claims.

What is claimed is:

1. In a two-dimensional array of magnetizable cores, said cores being arranged with their similar axes aligned along a first diagonal direction and being spaced for forming rows of aligned cores along said first diagonal direction;

a conductor threading all the cores of said array along their aligned similar axes;

said conductor forming two half sections with similar portions of each of said half sections threading pairs of adjacent rows of cores along said first diagonal.

2. The array of claim 1 wherein first similar portions of said half sections enter said array at first corner adjacent rows of cores along said first diagonal in a first direction; and subsequent similar portions of said half sections proceed along every next adjacent pair of adjacent rows in alternate directions along said first diagonal through said array.

3. In a two-dimensional array of magnetizable cores, said cores being aligned along first and second orthogonally directioned sets of parallel, diagonal rows;

a conductor threading all the cores of said array along their aligned diagonal row;

said conductor forming two half sections with similar portions of each of said half sections from a midpoint entering said array by threading pairs of next adjacent, like-aligned rows of cores along said first diagonal rows in alternate directions;

similar portions of each of said half sections threading pairs of next adjacent, like-aligned rows of cores along said second diagonal rows in alternate directions; and similar portions of each of said half sections exiting from said array along a pair of next adjacent, like-aligned rows of cores along said second diagonal rows.

4. In a two-dimensional array of magnetizable cores, said cores being aligned along first and second different directional sets of parallel, diagonal rows, and including a conductor threading all the cores of said array along their aligned diagonal row, said conductor threading a pattern through said array as follows:

entering said array along an entering first direction diagonal;

proceeding along every fourth first direction diagonal in alternate directions through said array;

re-entering said array along a second direction diagonal;

proceeding along every fourth second direction diagonal in alternate directions through said array and exiting at a midpoint of said conductor;

re-entering said array along a second direction diagonal in a direction opposite from the previous exiting direction;

proceeding along every fourth second direction diagonal in alternate directions through said array;

re-entering said array along a first direction diagonal; and, proceeding along every fourth first direction diagonal in alternate directions through said array and exiting from said array along an exiting first direction diagonal that is second adjacent the entering first direction diagonal.

5. In a two-dimensional array of magnetizable cores, said cores being aligned along first and second different directional sets of parallel, diagonal rows, and including a conductor threading all the cores of said array along their aligned diagonal row, said conductor threading a pattern through said array as follows:

entering said array at a first corner core along an entering first direction diagonal;

proceeding along every fourth first direction diagonal in alternate directions through said array;

re-entering said array at a second corner core along a second direction diagonal;

proceeding along every fourth second direction diagonal in alternate directions through said array and exiting at a midpoint of said conductor;

re-entering said array at a third corner core that is diagonally opposite said second corner core along a second direction diagonal in a direction opposite from the previous exiting direction;

proceeding along every fourth second direction diagonal in alternate directions through said array;

re-entering said array at a fourth corner core that is diagonally opposite said first corner core along a first direction diagonal; and proceeding along every fourth first direction diagonal in alternate directions through said array and exiting from said array along an exiting first direction diagonal that is second adjacent the entering first direction diagonal.

6. In a two-dimensional array of magnetizable cores, said cores being aligned along first and second different directional sets of parallel, diagonal rows, and including a conductor threading all the cores of said array along their aligned diagonal row, said conductor threading a pattern through said array as follows:

entering said array along an entering first direction diagonal corner row of cores re-entering said array along a second adjacent first direction diagonal row of cores re-entering said array along a second direction diagonal row of cores proceeding through said array along alternate first direction diagonal rows of cores and second direction diagonal rows of cores;

re-entering said array along a second direction diagonal corner row of cores re-entering said array along a next adjacent second direction diagonal row of cores re-entering said array along a first direction diagonal row of cores;

proceeding through said array along alternate second direction diagonal rows of cores and first direction diagonal rows of cores and exiting from said array along an exiting first diagonal direction row of cores that is adjacent the entering first diagonal direction row of cores.

References Cited

UNITED STATES PATENTS 3,012,231 12/1961 Kent ---------------- 340—174

JAMES W. MOFFITT, Primary Examiner